United States Patent [19]

Shannon

[11] 4,297,883

[45] Nov. 3, 1981

[54] RATE OF TURN INDICATOR

[76] Inventor: E. Paul Shannon, Rte. 2, Box 249, Killen, Ala. 35645

[21] Appl. No.: 103,354

[22] Filed: Dec. 13, 1979

[51] Int. Cl.³ .......................... G01P 9/02; G01C 19/42
[52] U.S. Cl. .................................... 73/504; 74/5 F; 74/5.6 E; 74/5.7
[58] Field of Search ................. 73/504; 74/5 F, 5 R, 74/5.6 E, 5.6 D, 5.7

[56] References Cited

U.S. PATENT DOCUMENTS

| | | | |
|---|---|---|---|
| 2,602,239 | 7/1952 | Wrigley | 73/504 |
| 2,948,155 | 8/1960 | Burkam | 74/5.6 E |
| 3,147,627 | 9/1964 | Hunn | 74/5.6 D |
| 3,324,733 | 6/1967 | Yownkin | 74/5.7 |
| 3,664,199 | 5/1972 | Lahde | 74/5.7 |

Primary Examiner—James J. Gill
Attorney, Agent, or Firm—Hugh D. Jaeger

[57] ABSTRACT

Rate of turn indicator for a nautical vessel, aircraft, and the like indicating the rate of turn or swing in units such as degrees per unit of time from a particular course of travel. The indicator includes a magnetic gyro wheel including a flexible hub rotating about an axis in the same plane as the course of travel and electromagnetic sensing coils receiving the deviations of strength of the electromagnetic field of the magnetic gyro wheel from an axis on turning from the course of travel. The magnetic gyro wheel includes a plurality of permanent magnets of alternating poles positioned about a circumferential axis of a circular member, and a flexible hub material affixed to the interior diameter of the circular member. The hub is affixed to an axially supported shaft. The magnetic gyro wheel forms a rotor of a direct current motor and is axially rotated by at least one drive coil. The rate of turn indicator includes a meter connected to the electromagnetic sensing coils through electrical circuitry and a potentiometer for zeroing the meter where the meter indicates the rate of turn.

34 Claims, 6 Drawing Figures

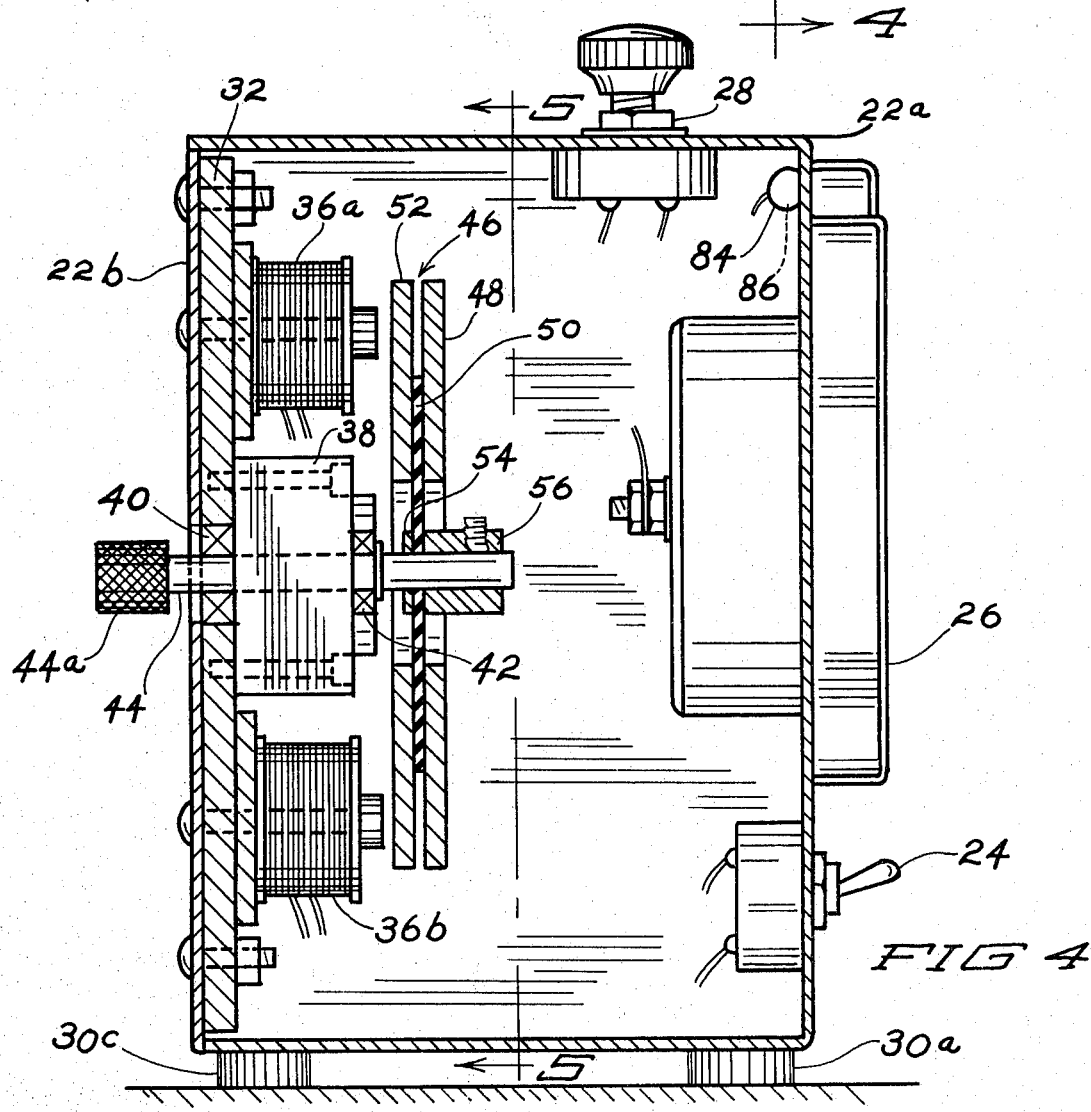

RATE OF TURN INDICATOR

BACKGROUND OF THE INVENTION

1. Field of the Invention

The present invention relates to a navigation aid or nautical instrument, and, more particularly, pertains to a rate of turn indicator for indicating the rate of turn from a course of travel for a vessel or other like vehicle.

2. Description of Prior Art

One of the most critical problems confronting the shipping industry, particularly towboats, is steering a vessel on a straight and true course without swinging or turning from the predetermined course due to forces of nature such as winds, tides, waves, etc.

Prior art gyroscopic instruments have been very expensive. The prior art gyros are usually complex, expensive electromechanical instruments with numerous mechanical components subject to structural failure in addition to electrical failure. The prior art instruments have included components such as gears, springs, rotors and brushes, centrifugal switches, all of which are subject to failure. Finally, the instruments had circuitry which sparked, and could be hazardous in explosive environments. In any event, if the instruments are purchased, after a costly financial outlay by an operator the installation, subsequent maintenance, and repair are expensive.

The present invention overcomes the disadvantages of prior art by providing a rate of turn indicator having easy visual readout for a steersman of a vessel that a rate of turn or swing is occurring, and yet sensitive and accurate to the rate of turn while eliminating prior art problems due to friction between components.

SUMMARY OF THE INVENTION

The present invention provides a rate of turn indicator for visually indicating the rate of turn or swing from a course of travel on a zero-center meter positioned on the face of the rate of turn indicator. This meter indication provides visual information to the steersman of the vessel indicating that the vessel is being subjected to a turning motion either to the left or the right, and also provides visual indication for bringing the vessel back onto a straight course if desired.

According to one embodiment of the present invention, there is provided a rate of turn indicator including a flexible hub magnetic gyro wheel having a disc including a plurality of permanent magnetic domains of alternating poles circumferentially positioned from the center of the wheel, the inner area of the wheel including a circular hub of flexible material providing for rigid rotation about the axis of the magnetic gyro wheel but flexible to lateral movements exerted on the wheel by angular vectorial forces due to rate of turn or swing of the vessel from a straight course, a pair of drive coils connected to a source of direct current and opposing and positioned adjacent to the flexible hub magnetic gyro wheel, a pair of pickup coils positioned adjacent to the magnetic gyro wheel and connected through a switching transistor back to the drive coils, and a zero-center meter connected to the pickup coils whereby currents induced in the drive coils rotate the flexible hub magnetic gyro wheel which also acts as a rotor of the DC motor, and the pickup coils receive induced currents on lateral movements of the flexible hub magnetic gyro wheel proportional to the rate of turn of the vessel thereby indicating on the zero-center meter that the vessel is turning or swinging from the present course of travel.

One significant aspect and feature of the present invention is a rate of turn indicator which provides direct visual indication to a steersman of a vessel or other like vehicle that a rate of turn or swing is occurring from a predetermined course of travel in an angular direction as indicated by the swing of a meter needle from zero center on the face of a meter. This rate of turn or swing is an easily identifiable visual indication to the steersman of the vessel and provides direct, easily observable indication that a rate of turn or swing is occurring in proportion to the deflection of the meter needle from the zero center on the meter face providing for compensation by the steersman of the vessel. The zero center position of the meter is very important, especially when docking a vessel in inland waterways.

Another significant aspect and feature of the present invention is a rate of turn indicator which is of minimal complexity and has only two moving parts, the flexible hub magnetic gyro wheel and the meter movement. The present invention relies on the recognition of principles of gyroscopic action, magnetic principles, conduction of currents, and electrical circuitry resulting in a navigational instrument which provides for visual indication of rate of turn or swing from a particular course of travel. The magnetic gyro wheel is the rotor of a DC motor, of novel design. The rate of turn indicator is a substantially linear instrument.

A further significant aspect and feature of the present invention is a rate of turn indicator which can be moved from position to position within a wheelhouse, or carried between wheelhouses of vessels and only needs be set upon a substantially flat surface, usually within the view of a steersman of a vessel and in view from the steering position of the vessel. No alignment of the instrument is necessary except for centering of the meter with the zero-center control. The instrument is of a compact physical size requiring minimal space and of a desirable small weight not presenting a burdensome weight restriction. Finally, the rate of turn indicator as disclosed can easily operate from the vessel's power or from other power sources as later described.

Having described the present invention, it is a principal objective hereof in providing a rate of turn indicator.

One objective of the present invention is to provide a rate of turn indicator having direct visual readout of the rate of turn or swing from a course of travel which is visually perceived, and understandable by a steersman of a vessel or other like vehicle. The navigational instrument, being the rate of turn indicator, visually displays the information readily readable on a meter face of the instrument, and corresponds proportionally to the angular turn or swing of the vessel which may include a tow of barges or just a vessel itself such as a towboat, freighter, tanker, or other like vehicle.

Still another objective of the present invention is to provide a rate of turn indicator utilizing a magnetic gyro wheel of novel construction with minimal components and of economical feasibility. One requirement is that the magnetic gyro wheel be axially rotated about a radial axis but yet also be flexible providing for lateral movement corresponding to the angular directional turn of a vessel or like vehicle. The magnetic gyro wheel meets this objective by providing a plurality of permanent magnetic domains of alternating poles spaced about an outer periphery of a circumferential flexible-hub member having axial stiffness but lateral flexibility providing for gyroscopic action of the magnetic poles of the magnetic gyro wheel occurring on account of variation from the course of steerage.

A further objective of the present invention is to provide a rate of turn indicator which utilizes the magnetic gyro wheel as a rotor of a motor and drives the flexible hub magnetic gyro wheel. By utilizing the magnetic gyro wheel, there are minimal components required for the rate of turn indicator providing for decrease in physical size and physical weight.

An additional objective of the present invention is a rate of turn indicator which provides the steersman of the vessel the opportunity to steer a straight course while indicating any deviation or variation from that course, thus saving energy of the vessel in steering a straight course and further, and most importantly, protecting life and property and environment. The rate of turn indicator indicates the slightest variation from a straight course upon that variation occurring and visually displays this information on the face of the meter. This information can be interpreted by the steersman of a vessel instantaneously providing for correction of the course, thus saving energy and protecting life and property on the water.

A still additional objective of the present invention is a rate of turn indicator which requires a least amount of driving energy since no external driving motor is required to drive the flexible hub magnetic gyro wheel as the magnetic gyro wheel inherently is the rotor of the motor.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the FIGURES thereof and wherein:

FIG. 2 illustrates a front view of the rate of turn indicator;

FIG. 3 illustrates a side view of the rate of turn indicator;

FIG. 4 illustrates a sectional view taken along line 4—4 of FIG. 2;

DESCRIPTION OF ONE PREFERRED EMBODIMENT

Figure 1:
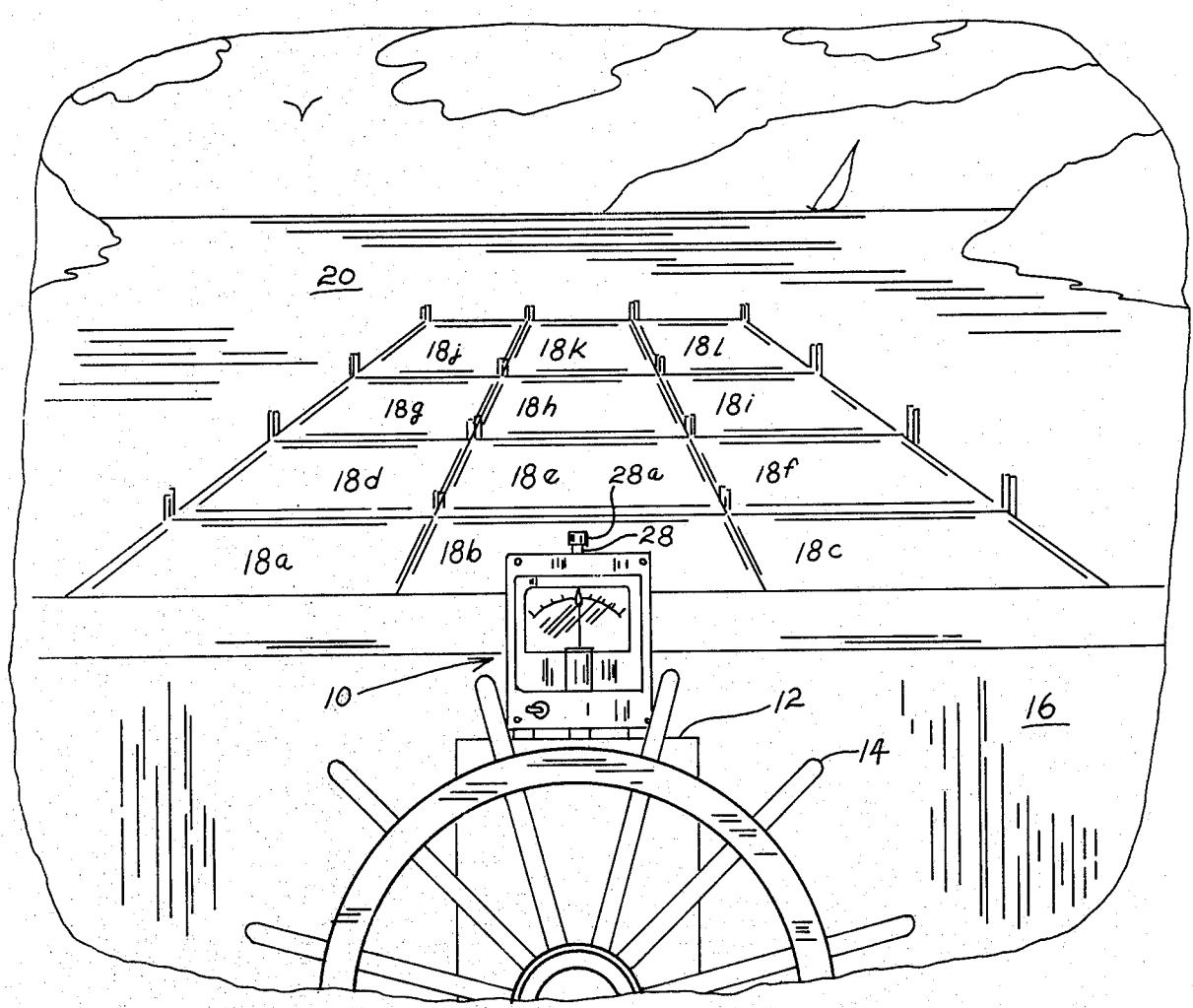
FIG. 1 illustrates a front view through a pilothouse window of a towboat showing a rate of turn indicator, the present invention, in a convenient viewing position of a wheel.

FIG. 1, which illustrates a front view through a pilothouse window of a towboat showing a rate of turn indicator 10, the present invention, displays a rate of turn indicator 10 on a bridge shelf 12 within view of a wheel 14 in a wheelhouse 16 of a towboat. The towboat pushes a tow of barges 18a through 18L on a river 20. The tow of barges is not construed to be limiting in number, and is only illustrated by way of example and for purposes of illustration only.

FIG. 2, which illustrates a front plan view of the rate of turn indicator 10, including a housing 22, an on/off switch 24 in a lower left portion of the housing, a meter 26 having a zero-center scale 26a, and a potentiometer 28 having a large knob 28a. Feet 30a through 30d support the housing 22.

FIG. 3, which illustrates a side view of the rate of turn indicator 10, shows numerals which correspond to those elements previously delineated. A shaft 44 connects to a flexible hub magnetic gyro wheel 46 as later described in detail and as illustrated in FIG. 4. The housing 22 includes a forward U-shaped housing 22a and a rearward U-shaped housing 22b which form the rectangular housing 22.

Figure 5:
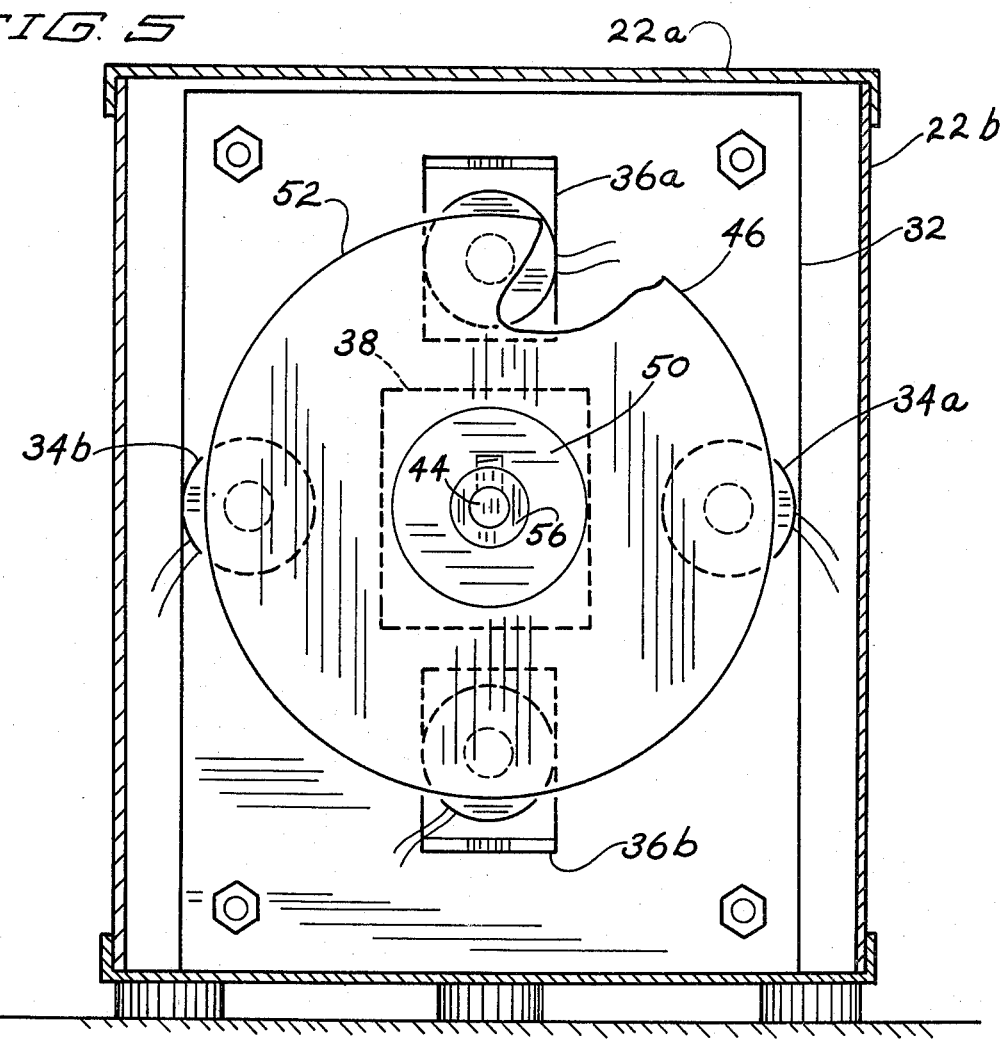
FIG. 5 illustrates a sectional view taken along line 5—5 of FIG. 4.

FIG. 4, which illustrates a cross-sectional view taken along line 4—4 of FIG. 2, shows an interior view of the rate of turn indicator 10. The front housing 22a supports the meter 26, the potentiometer 28, the feet 30a through 30d, and the on/off switch 24. The rearward housing 22b supports a rectangular member 32 which includes drive coils 34a and 34b as best illustrated in FIG. 5 and electromagnetic pickup sensing coils 36a and 36b. The rectangular member 32 is secured to the rear housing 22b by bolts and the coils are secured to rectangular member 32 by bolts. The coils can be directly bolted to rear housing 22b as so desired. Smaller rectangular member 38 affixes to rectangular member 32 with threaded screws as illustrated in the figure. Opposing and aligned bearings 40 and 42 are affixed to the rectangular members 32 and 38 respectively. The shaft 44 including a knurled knob 44a axially rotates within the bearings 40 and 42 and supports the flexible hub magnetic gyro wheel 46. The flexible hub magnetic gyro wheel 46 includes a steel ring 48, a hub of flexible material 50 such as rubber diaphragm material by way of example and for purposes of illustration only, a ring of ferromagnetic material 52 having a plurality of alternating magnetic domains such as ten, by way of example and for purposes of illustration only, circumferentially spaced about the ring 48, and a set washer 54 and a set collar 56 opposing each other on either side of the hub material 50.

FIG. 5, which illustrates a view taken along line 5—5 of FIG. 4, partly in cross-section, shows the rectangular member 32, the rectangular member 38, the drive coils 34a and 34b, and the pickup coils 36a and 36b. Wires suitably connect to the drive coils 34 and pickup coils 36 respectively as now described in FIG. 6.

Figure 6:
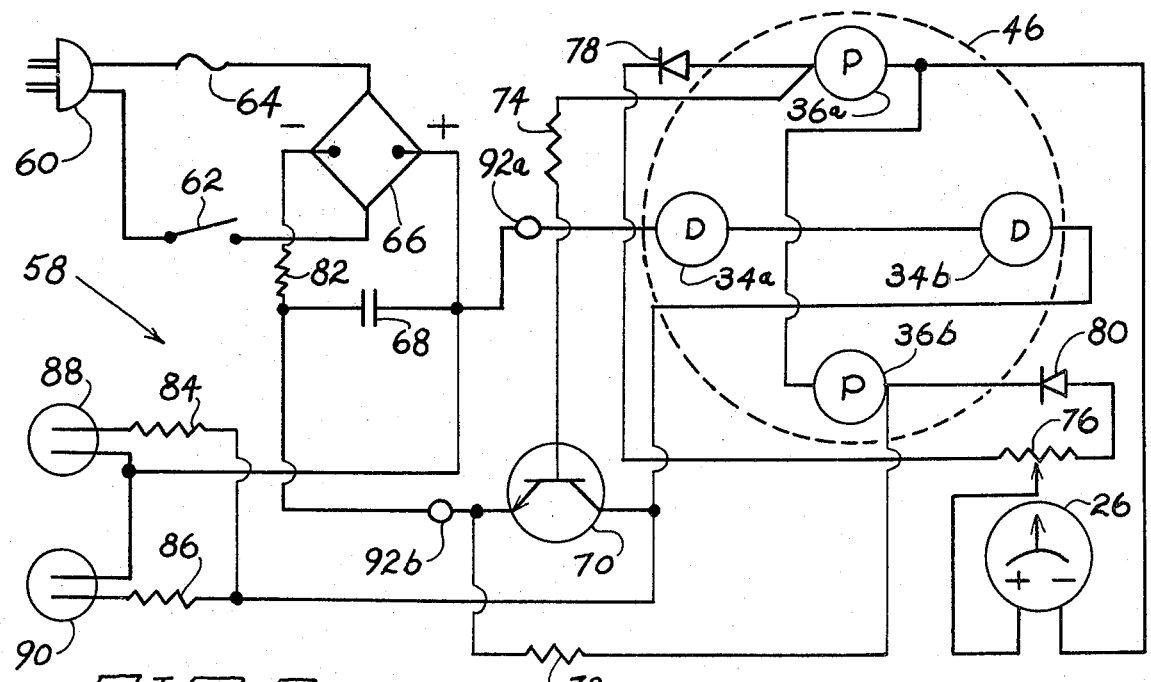
FIG. 6 illustrates an electrical schematic diagram for the rate of turn indicator.

FIG. 6 illustrates an electrical circuit schematic 58 for the rate of turn indicator 10. One side of an AC plug 60, a switch 62, and a fuse 64 connect to a full wave bridge rectifier 66. Resistor 82, capacitor 68 and the bridge rectifier 66 provide DC power for the DC motor which inherently includes the flexible hub magnetic gyro wheel 46 which is also the rotor of the DC motor which inherently drives the flexible hub magnetic gyro wheel 46. The collector of a switching transistor 70 connects to one side of the drive coil 34b. The positive side of the DC source connects to one side of the other drive coil 34a. The other sides of the drive coils 34a and 34b connect together respectively. One side of the meter 26 connects to one side of the pickup coil 36a. The other side of the pickup coil 36a connects to the base of the transistor 70 through a fixed resistor 74. The other side of the meter 26 connects to a center arm of a potentiometer 76, both sides of which connect to the pickup coils 36a and 36b through diodes 78 and 80 respectively. Resistors 84 and 86 connect in series with the neon lamps 88 and 90 which serve as pilot lamps to illuminate the dial face of the meter 26 and spike suppressors to reduce rf interference. Resistor 82 limits the charging current of the filter capicator 68 and protects the bridge rectifier 66. Resistors 72 and 74 apply a portion of the alternating current induced in the pickup coils 36a and 36b to the emitter and base respectively of the transistor 70.

PREFERRED MODE OF OPERATION

The rate of turn indicator 10 is positioned on a bridge shelf within view of the wheel in the wheelhouse of a towboat which is pushing a tow of barges on a body of water. The plug 60 is plugged into a suitable AC outlet, the switch 62 turned on, and the zero-center control 28 adjusted to center the meter 26 once the flexible hub magnetic gyro wheel 46 has reached speed.

In starting the rate of turn indicator 10, it is necessary to provide a torque with a twist of the knurled knob 44a of the shaft 44 in the appropriate direction. The shaft 44 must be rotated in the proper direction by applying a twisting action to the knurled knob 44a on the external end of the shaft 44. Once the shaft is set in motion, the shaft quickly gains rotational velocity to operating velocity, and continues to run until the power is turned off. The flexible hub magnetic gyro wheel 46 of course is rotated inherently with the shaft 44. The switching transistor 70 switches current to the drive coils 34a and 34b simultaneously. The diodes 78 and 80 limit the direction of flow of the current for the meter circuit.

While the DC motor, formed by the drive coils 34a and 34b and the flexible hub magnetic gyro wheel 46 which inherently is the rotor, is capable of running equally well in either direction if so designed, the motor must be designed to run in only one direction when used in the rate of turn indicator. If the motor were to run in the wrong direction, the readout from the motor would be reversed. The motor can be designed to run in either the clockwise or counterclockwise direction as desired, but the meter circuit must be wired accordingly.

According to one disclosed embodiment as specially illustrated in the figures, the angle between the pickup coil 36a and the drive coil 34b is slightly less than ninety degrees providing for counterclockwise rotation as viewed in the first quadrant of FIG. 5, and therefore operation of the rate of turn indicator 10 in only one direction thereby providing for consistent meter circuit operation. Proper phase relation is therefore provided between the pickup coils and the drive coils for desired direction of rotation.

In use, the rate of turn indicator 10 operates on the principle that as the flexible hub magnetic gyro wheel 46 rotates in a radial direction equal voltages are indicated in the pickup coils 36a and 36b when running and no turn is being made. If the vessel begins to swing or turn in either direction from the center course of travel, an imbalance of voltage occurs in the pickup coils 36a and 36b due to the radial turn of the flexible hub magnetic gyro wheel 46 causing the meter needle to swing on either side of center of the meter face 26a of the meter 26. The turn causes the flexible hub magnetic gyro wheel 46 to move closer to one of the pickup coils and farther away from the other pickup coil thereby causing an imbalance in the voltages of the two coils and also causing current of a given direction and magnitude to flow through the meter 26. Direction and magnitude of the meter current are dependent upon the direction and rate of turn. This is an indication to the steersman of the vessel that compensation will be needed to bring the tow back to course. Of course, when the vessel is turning such as around a bend in a river, the rate of turn indicator 10 will indicate a change of course and swing accordingly. The flexible hub magnetic gyro wheel 46 inherently acts as the rotor of the DC motor formed by the drive coils 34a and 34b and the magnetic gyro wheel 46, the rotor of the DC motor. The flexible hub magnetic gyro wheel 46 inherently performs as a rotor of the DC motor which powers itself not only as a rotor, but also as the magnetic gyro wheel 46. The torque of the DC motor, inherently a part of the rate of turn indicator 10, is applied from magnets of the rotor to the shaft eliminating strain on the flexible hub of the magnetic gyro wheel 46. The electromechanical structure as described provides a single DC motor rate of turn indicator 10. Sensitivity of the rate of turn indicator 10 is substantially sixty degrees per minute full scale or about fifteen degrees per minute per graduation by way of example and for purposes of illustration, but is not to be construed as limiting of the present invention. In lieu of operating the rate of turn indicator 10 from an AC source of power, a direct current source of power such as a small battery can be connected directly to points 92a and 92b of FIG. 6 of the circuit schematic diagram in lieu of using power supply components 60–68. The DC source of power can be a battery. Depending upon the voltage of the power source, circuit component values may have to be changed.

Various modifications can be made to the rate of turn indicator of the present invention without departing from the apparent scope thereof. In lieu of using two drive coils and two pickup coils, the rate of turn indicator can be constructed using only one drive coil and one pickup coil. Of course, the pickup coil would still provide a voltage of proper phase to the switching transistor to further energize the drive coil. Also, the physical relationship of the pickup coil, the drive coil, and the flexible hub magnetic gyro wheel determines the direction of rotation of the magnetic gyro wheel and the speed of rotation.

Having thus described the present invention which is desired to be secured by Letters Patent, what is claimed is:

1. Rate of turn indicator comprising:
   a. support member including at least one drive coil and at least two pickup coils positioned about an axis with respect to each other on said member;
   b. bearing means mounted on said axis of said support member;
   c. magnetic gyro wheel means including at least two magnet domains of alternating poles positioned about the periphery of a flexible material and axially supported in said bearing means; and,
   d. signal processing means connected to said pickup coil and including visual indicating means whereby said magnetic gyro wheel induces currents in said pickup coils subject to the rate of turn of said vessel from a course of travel thereby being visually displayed on said indicating means.

2. Rate of turn indicator of claim 1 including two drive coils, one side of each coil connected together, the other side of one coil connected to one side of a DC power source through a switching transistor, and pickup coils, one side of each coil connected together, the other side of said pickup coils connected to said indicating means and to a base of said switching transistor whereby said pickup coils supply a phased voltage to said switching transistor to energize said drive coils thereby driving said motor.

3. Rate of turn indicator of claim 1 wherein said drive coil connects to a switched DC power source whereby said drive coil drives said magnetic gyro wheel means as a DC motor.

4. Rate of turn indicator of claim 1 wherein said magnetic gyro wheel means comprises a hub of flexible material yielding in a lateral direction but not yielding in an axial direction and including a plurality of permanent magnets positioned about an outer circumferential periphery of said hub, the poles of said magnets alternating about said periphery.

5. Rate of turn indicator of claim 1 wherein said sensing means comprises spaced opposed electromagnetic sensing pickup coils whereby said magnetic gyro wheel means induces alternating voltages in said spaced opposed coils.

6. Rate of turn indicator of claim 1 wherein said signal processing means includes rectifiers for converting said induced alternating current into direct current.

7. Rate of turn indicator of claim 1 wherein said indicating means comprises a zero-center meter whereby said signal processing means communicates to said zero-center meter thereby indicating the degree of rate of turn from a course of travel from the center of said meter.

8. Rate of turn indicator of claim 1 comprising zero-center means connected to said indicating means whereby said zero-center means display said indicating means.

9. Rate of turn indicator of claim 1 wherein said magnetic gyro wheel comprises two rings, a hub of flexible material disposed therebetween, and one of said rings magnetized with domains of alternating poles about said circumferences.

10. Rate of turn indicator of claim 1 wherein one of said drive coils is at an angle of less than ninety degrees to one of said pickup coils.

11. Rate of turn indicator of claim 10 wherein said less than ninety degree angular displacement of said coils is in a first quadrant of said rate of turn indicator.

12. Rate of turn indicator of claim 11 wherein said direction of rotation is counterclockwise as viewed from the front of said rate of turn indicator.

13. In combination, motor and rate of turn indicator comprising:
   a. support member supporting two opposing drive coils and two opposing pickup coils, said drive coils and said pickup coils angularly positioned with respect to each other;
   b. magnetic gyro wheel including a plurality of permanent magnetic domains spaced about a hub of flexible material having yielding lateral properties and rigid axial properties, said poles of said magnetic domains alternating;
   c. shaft means supported by bearings on an intersecting axis of said pickup coils and drive coils, and affixed to said magnetic gyro wheel; and,
   d. signal processing means including visual indicating means connected to said pickup coils whereby said signal processing means processes currents induced in said pickup coils thereby displaying said rate of swing information on said visual indicating means.

14. Rate of turn indicator of claim 13 wherein said wheel comprises a first ring and second ring of like material, said rings magnetized with a like number of alternating poles, and said poles are aligned to complement and enhance each other.

15. Rate of turn indicator of claim 13 wherein said flexible hub provides for said wheel to assume different angular positions with respect to said axis.

16. Rate of turn indicator of claim 13 wherein said flexible hub magnetic gyro wheel provides for said wheel to tilt about said axis and assume different angular positions with respect to said axis but restrains mass of said wheel from shifting in any angular direction outwardly from said axis thereby maintaining mechanical balance.

17. Rate of turn indicator of claim 13 wherein said signal processing means comprises a diode rectifier circuit.

18. Rate of turn indicator of claim 13 wherein said indicating means comprises a zero center meter.

19. Rate of turn indicator of claim 13 comprising means for starting flexible hub magnetic gyro wheel axially rotating.

20. Rate of turn indicator of claim 13 comprising switching means connected between a direct current source of power and said drive coils whereby said drive coil drives said wheel thereby forming said motor.

21. In combination, motor and rate of turn indicator comprising:
   a. support member supporting one drive coil and one pickup coil, said coils angularly positioned with respect to each other;
   b. magnetic gyro wheel including a plurality of permanent magnetic domains spaced about a hub of flexible material having yielding lateral properties and rigid axial properties, said poles of said magnetic domains alternating;
   c. shaft means supported by bearings on an intersecting axis of said coils, and affixed to said magnetic gyro wheel; and,
   d. signal processing means including visual indicating means connected to said pickup coil whereby said signal processing means processes currents induced in said pickup coil thereby displaying said rate of swing information on said visual indicating means.

22. Rate of turn indicator of claim 21 wherein said wheel comprises first ring and second ring of like material and at least one of said rings magnetized with a plurality of alternating poles.

23. Rate of turn indicator of claim 21 wherein said flexible hub provides for said wheel to assume different angular positions with respect to said axis.

24. Rate of turn indicator of claim 21 wherein said flexible hub magnetic gyro wheel provides for said wheel to tilt about said axis and assume different angular positions with respect to said axis but restrains mass of said wheel from shifting in any angular direction outwardly from said axis thereby maintaining mechanical balance.

25. Rate of turn indicator of claim 21 wherein said signal processing means comprises a diode rectifier circuit.

26. Rate of turn indicator of claim 21 wherein said indicating means comprises a zero center meter.

27. Rate of turn indicator of claim 21 comprising switching means connected to said drive coil and a direct current source of power connected to said switching means whereby said drive coil drives said wheel of said motor of said rate of turn indicator.

28. Rate of turn indicator comprising:

a. support member supporting at least one drive coil and at least one pickup coil, said coils angularly positioned with respect to each other, and a switched direct current power source means connected to said drive coil;
b. magnetic gyro wheel including a plurality of permanent magnetic domains spaced about a hub of flexible material having yielding lateral properties and nonstretchable properties, said poles of said magnetic domains alternating;
c. shaft means supported by bearings on an intersecting axis of said coils, and affixed to said hub of said magnetic gyro wheel; and,
d. signal processing means including visual indicating means connected to said pickup coil whereby said signal processing means processes currents induced in said pickup coil thereby displaying said rate of swing information on said visual indicating means and whereby said drive coil and said magnetic gyro wheel form a direct current motor and said magnetic gyro wheel and said pickup coil form said sensing circuit of said rate of turn indicator.

29. Rate of turn indicator of claim 28 wherein said magnetic gyro wheel comprises two rings of ferromagnetic material and said hub of flexible material disposed therebetween.

30. Rate of turn indicator of claim 28 wherein said direct current motor connects to a battery through a switching means connected to said drive coil.

31. Rate of turn indicator of claim 19 comprising at least one neon lamp illuminating said visual indicating means.

32. Rate of turn indicator of claim 28 comprising means for starting rotation of said magnetic gyro wheel.

33. Rate of turn indicator of claim 28 wherein said flexible hub of said magnetic gyro wheel provides said wheel to assume different angular positions with respect to said axis but restrains mass of said wheel shifting in any direction outward from said axis thereby maintaining mechanical balance.

34. Rate of turn indicator of claim 28 wherein said switched direct current power source means comprises switching means connected between a direct current power source and said drive coil.

* * * * *